(12) United States Patent
Christensen et al.

(10) Patent No.: US 12,299,319 B2
(45) Date of Patent: May 13, 2025

(54) RATING-BASED MAPPING OF DATA TO MEMORY

(71) Applicant: Micron Technology, Inc., Boise, ID (US)

(72) Inventors: Carla L. Christensen, Boise, ID (US); Gangotree Chakma, San Jose, CA (US); Yingqi Zheng, San Jose, CA (US); Yunfei Xu, Santa Clara, CA (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/666,290

(22) Filed: May 16, 2024

(65) Prior Publication Data

US 2024/0370198 A1    Nov. 7, 2024

Related U.S. Application Data

(63) Continuation of application No. 17/883,218, filed on Aug. 8, 2022, now Pat. No. 12,014,077.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G06F 3/0655; G06F 3/0604; G06F 3/064; G06F 3/0679; G06F 3/0688; G06F 3/0608
See application file for complete search history.

(56) References Cited

U.S. PATENT DOCUMENTS

| | | | |
|---|---|---|---|
| 9,269,447 B1 * | 2/2016 | Nakajima | G11C 16/349 |
| 9,959,060 B1 * | 5/2018 | Tang | G06F 3/0679 |
| 9,959,067 B2 | 5/2018 | Yang et al. | |
| 2012/0317337 A1 | 12/2012 | Johar et al. | |
| 2013/0151764 A1 | 6/2013 | Strope | |
| 2023/0114493 A1 | 4/2023 | Kim | |

* cited by examiner

*Primary Examiner* — Khoa D Doan
(74) *Attorney, Agent, or Firm* — Holland & Hart LLP

(57) ABSTRACT

Methods, systems, and devices for rating-based mapping of data to memory are described. A memory system may determine a first rating for a set of data selected for writing to a memory system. The memory system may select a target page of a block in the memory system for writing the set of data based at least in part on a second rating for the target page. The memory system may write the set of data to the target page based at least in part on the first rating for the set of data corresponding to the second rating for the target page.

20 Claims, 6 Drawing Sheets

RATING-BASED MAPPING OF DATA TO MEMORY

CROSS REFERENCE

The present application for patent is a continuation of U.S. patent application Ser. No. 17/883,218 by Christensen et al., entitled "RATING-BASED MAPPING OF DATA TO MEMORY," filed Aug. 8, 2022, assigned to the assignee hereof, and is expressly incorporated by reference in its entirety herein.

FIELD OF TECHNOLOGY

The following relates to one or more systems for memory, including rating-based mapping of data to memory.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

A memory system may include pages of memory cells that are grouped into blocks. As the memory system operates, the memory system may monitor the performance of the blocks and if the performance of a block falls below a threshold level, the memory system may "retire" the block by adding the block to a list of blocks to avoid for access operations. But some of the pages in the retired block may still be capable of performing above the threshold level. That is, the memory system may retire a block based on (e.g., due to) the poor performance of a subset of pages (which may be attributed to the entire block) even though other pages in the block are capable of higher performance. Retiring entire blocks of pages due to the poor performance of a subset of the pages may reduce the capacity of a memory system, among other disadvantages.

According to the techniques described herein, a memory system may preserve capacity and efficiently use the pages of a block, among other advantages, by writing data to the pages based on ratings for the data and the pages. For example, the memory system may determine priority ratings for data and performance ratings for pages (e.g., on a page basis) or blocks. If the memory system has a set of data for writing to a page, the memory system may determine the priority rating assigned to that set of data and may write the set of data to a page (or a block) that is assigned a performance rating that maps to the priority rating. That is, the memory system may write data to pages that have performance ratings that correspond to (e.g., are associated with) the priority ratings of the data. Thus, the memory system may continue to use blocks with poor-performing pages (e.g., pages that have low performance ratings) by using the poor-performing pages for low priority data, which may preserve the capacity of the memory system.

Figure 1:
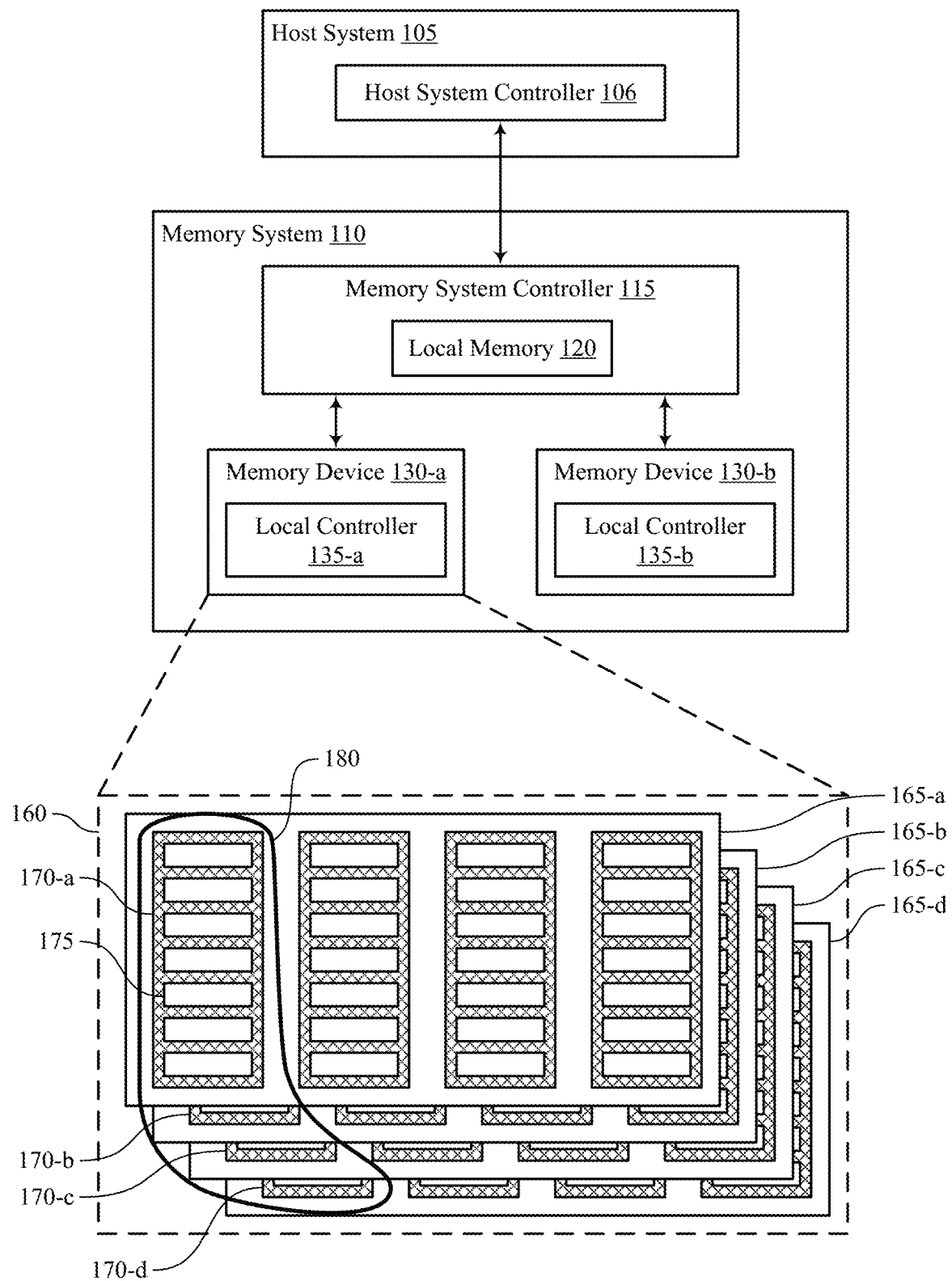
FIG. 1 illustrates an example of a system that supports rating-based mapping of data to memory in accordance with examples as disclosed herein.
Figure 2:
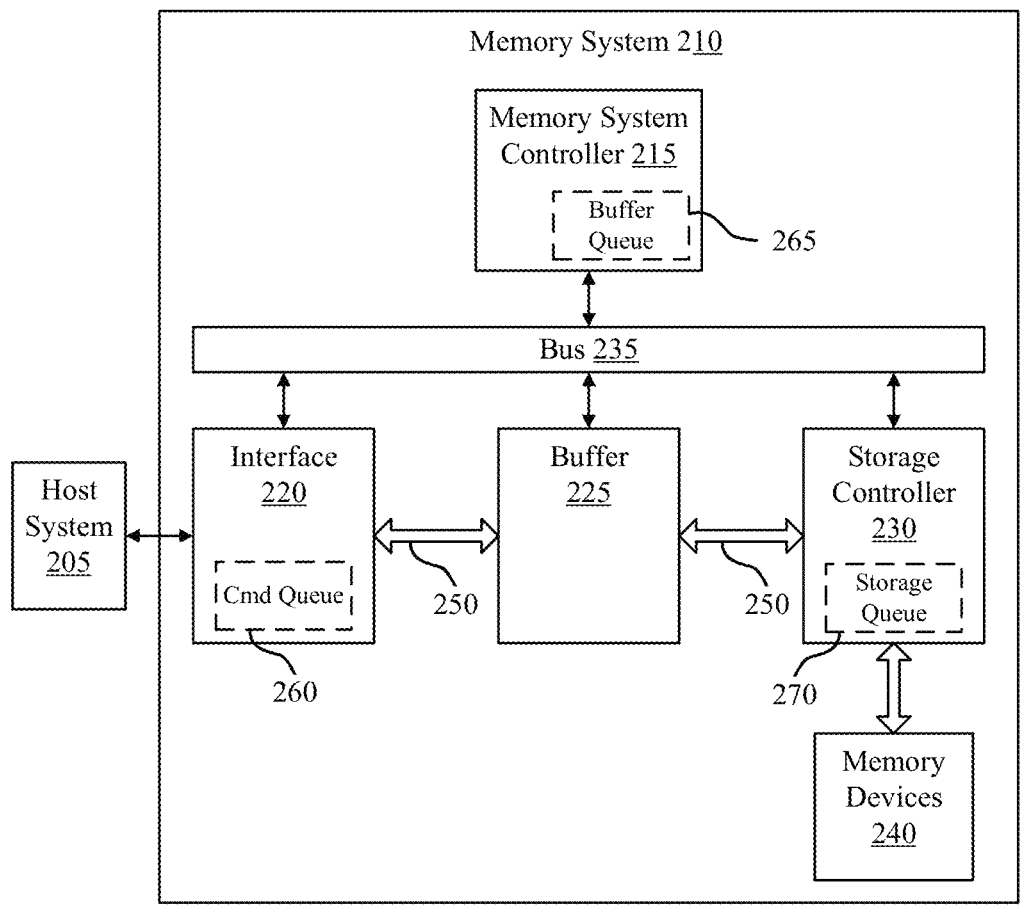
FIG. 2 illustrates an example of a system that supports rating-based mapping of data to memory in accordance with examples as disclosed herein.

Features of the disclosure are initially described in the context of systems, devices, and circuits with reference to FIGS. 1 through 2. Features of the disclosure are described in the context of a system and a process flow with reference to FIGS. 3 through 4. These and other features of the disclosure are further illustrated by and described in the context of an apparatus diagram and flowchart that relate to rating-based mapping of data to memory with reference to FIGS. 5 through 6.

FIG. 1 illustrates an example of a system 100 that supports rating-based mapping of data to memory in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

A garbage collection operation may be an example of a maintenance operation. In some examples, the memory system 110 may support other types of maintenance operations, such as refresh operations. A refresh operation may refer to an operation in which the data (e.g., both valid data and invalid data) in a block is re-written to the same block or copied to another block. The memory system 110 may use refresh operations to improve the reliability of data, which may otherwise become corrupted over time.

In some examples, the memory system 110 may retire blocks 170 that are performing poorly. For instance, the memory system 110 may determine that a block 170 is underperforming (e.g., is unreliable) and may add the block to a list of blocks to avoid for access operations. The memory system 110 may determine that a block is unreliable based on (e.g., due to) the error rate associated with the block, which may be determined by performing a scan operation in which data is read from the block and subjected to error detection processing (e.g. error correction code (ECC) decoding).

But the pages within a block may have varying reliability. So, the memory system 110 may retire blocks 170 that, although associated with a threshold error rate, include pages that have a lower error rate (e.g., higher reliability). Retiring entire blocks of pages irrespective of page-specific performance may reduce the capacity of the memory system 110. As blocks increase in capacity, the issue may be exacerbated as relatively small portions of memory serve to retire larger and larger portions of memory.

According to the techniques described herein, the memory system 110 may preserve capacity (and efficiently use pages, among other advantages) by assigning performance ratings on a page-basis so that blocks with low-performance pages can continue to be used and so that data can be matched with appropriate pages (e.g., pages capable of matching the performance metrics associated with the data). That is, the memory system 110 may refrain from retiring blocks with a threshold error rate and instead continue to use the pages of such blocks by writing data to the pages in accordance with a mapping between the priority rating for the data and the performance rating for the pages. Although described with reference to pages, the techniques described herein can be applied at other granularities, such as at the word line level. Thus, the techniques described herein may be applied to portions (e.g., pages, word lines, word line groups) of a memory system 110.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support rating-based mapping of data to memory. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

FIG. 2 illustrates an example of a system 200 that supports rating-based mapping of data to memory in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, after completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. After receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

After a determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, performing garbage collection). The entries may be added to the storage queue 270, e.g., by the memory system controller 215. The entries may be removed from the storage queue 270 (e.g., by the storage controller 230 or memory system controller 215) after completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, the memory system 210 may assign performance ratings to pages of blocks in the memory device 240. The memory system 210 may also assign priority ratings to (or determine priority ratings assigned to) data for writing (e.g., incoming data from the host system 205 or data targeted for maintenance operations). The memory system 210 may use a mapping between the performance ratings and the priority ratings to select pages for writing data. For instance, within a block the memory system 210 may select a page with a low performance rating for writing data that has a low priority rating. Similarly, the memory system 210 may select a page with a high performance rating for writing data with a high priority rating.

Thus, memory system 210 may continue to use blocks that would otherwise (e.g., in other systems) be retired, which may help preserve the capacity of the memory system 210. Additionally, mapping data to pages based on (e.g., using) ratings may prevent the memory system 210 from over-provisioning or under-provisioning data, which may be inefficient. Over-provisioning data may refer to the scenario in which low priority data is written to pages with unnecessarily high performance metrics, whereas under-provisioning data may refer to the scenario in which high priority data is written to pages with unsuitably low performance metrics.

Although described with reference to priority ratings and performance ratings, the techniques described herein may be applied to other types of ratings.

Figure 3:
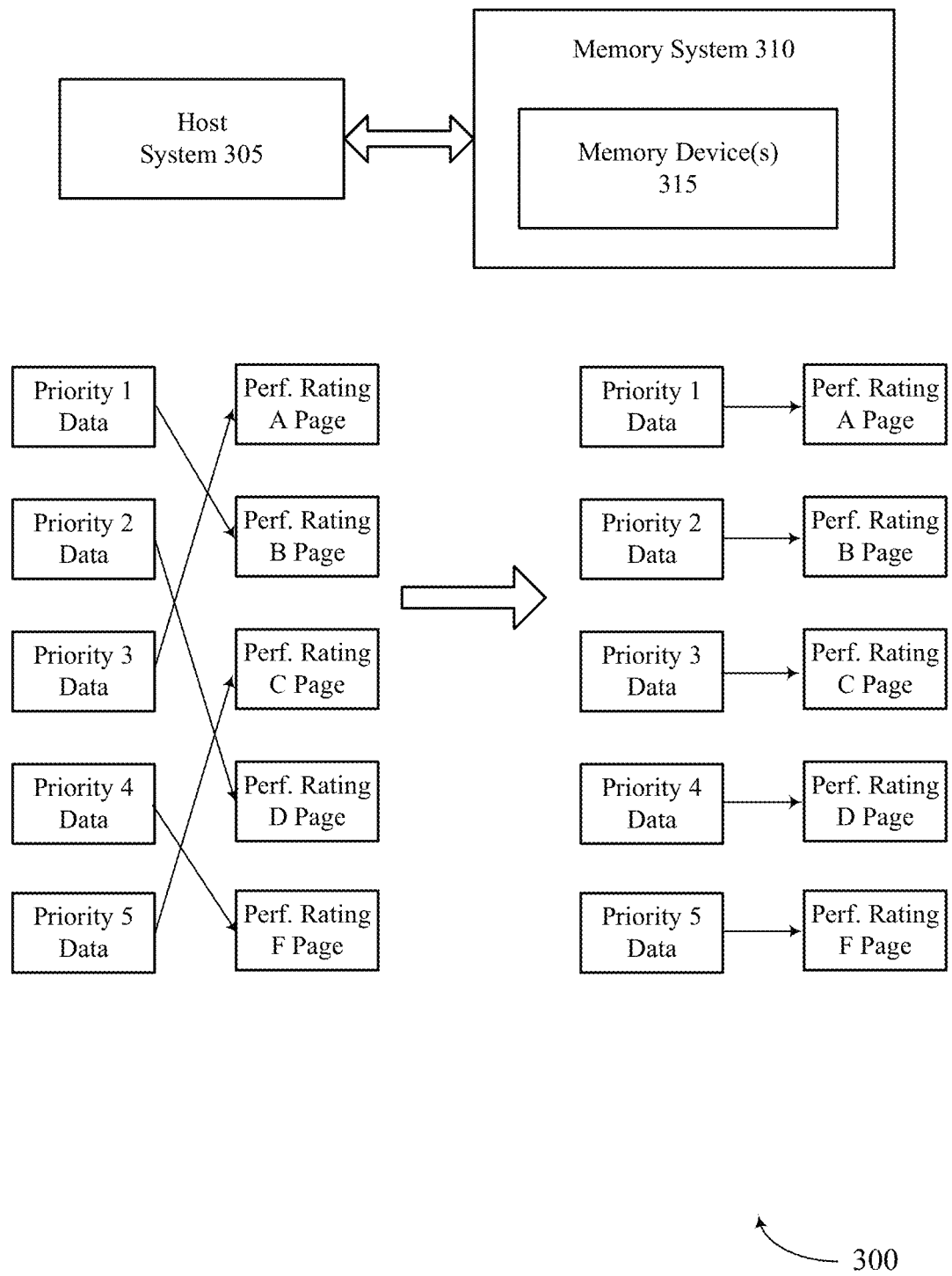
FIG. 3 illustrates an example of a system that supports rating-based mapping of data to memory in accordance with examples as disclosed herein.

FIG. 3 illustrates an example of a system 300 that supports rating-based mapping of data to memory in accordance with examples as disclosed herein. The system 300 may include a host system 305 and a memory system 310, which may be examples of corresponding systems as described herein. The host system 305 and the memory system 310 may communicate over an interface coupled with the host system 305 and the memory system 310. For example, the host system 305 may communicate commands and data to the memory system 310 over the interface and the memory system 310 may communicate data to the host system 305 over the interface. The memory system 310 may preserve capacity by assigning ratings (e.g., performance ratings) on a page-basis so that the memory system 310 can continue to use low-performing blocks (as opposed to retiring the low-performing blocks). Assigning ratings on a page-basis may also allow the memory system to efficiently use high-performing pages.

The memory system 310 may include one or more memory device(s) 315, which may include blocks of memory cells that are grouped into pages (or other memory units). The memory system 310 may intermittently (e.g., periodically) perform scan operations on the blocks so that the memory system 310 can assign performance ratings to the blocks and the pages in the blocks. A scan operation may include reading a block and performing error detection processing on the data read from the block to determine performance metrics such as error rate and read latency. After performing a scan operation on a block, the memory system 310 may assign performance ratings to the pages of the block based on (e.g., using) the performance metrics for the pages. The memory system 310 may also assign a performance rating to the block, which may be based on (e.g., a function of) the performance ratings of some or all of the pages in the block. For instance, the performance rating for a block may be the average of the page performance ratings.

In some examples, the memory system 310 may assign a page a performance rating based on (e.g., using) the performance metrics of the page satisfying corresponding thresholds. For example, referring to Table 1, the memory system 310 may assign performance level A (e.g., the highest performance level) to any page that i) has an error rate $Rate_{ERROR}$ less than threshold error rate $Err_A$, ii) has a read latency $R_{LATENCY}$ less than threshold read latency $R_{THLD\_A}$, or both. And so on and so forth as shown in Table 1, which is a non-limiting example. In some examples, the error rate may be the raw bit error rate (RBER), which may be the error rate for a set of memory cells (e.g., a page) before error correction is applied.

TABLE 1

| Performance Rating | Error Rate | Read Latency |
| --- | --- | --- |
| A | $Rate_{ERROR} < Err_A$ | $R_{LATENCY} < R_{TH\_A}$ |
| B | $Err_A < Rate_{ERROR} < Err_B$ | $R_{TH\_A} < R_{LATENCY} < R_{TH\_B}$ |
| C | $Err_B < Rate_{ERROR} < Err_C$ | $R_{TH\_B} < R_{LATENCY} < R_{TH\_C}$ |
| D | $Err_C < Rate_{ERROR} < Err_F$ | $R_{TH\_C} < R_{LATENCY} < R_{TH\_F}$ |
| F | $Err_F < Rate_{ERROR}$ | $R_{TH\_F} < R_{LATENCY}$ |

In other examples, the memory system 310 may assign a page a performance rating based on (e.g., using) the relative performance metrics of the pages in the block. For example, referring to Table 2, the memory system 310 may assign performance level A to the pages that i) have error rates in the top 5% for the block, ii) have read latencies in the top 5% of the block, or both. And so on and so forth as shown in Table 2, which is a non-limiting example.

TABLE 2

| Performance Rating | Error Rate | Read Latency |
| --- | --- | --- |
| A | Top 5% | Top 5% |
| B | 5-10% | 5-10% |
| C | 10-50% | 10-50% |
| D | 50-90% | 50-90% |
| F | 90-100% | 90-100% |

Thus, the memory system 310 may assign performance ratings to pages of the memory device 315 on a page-by-page basis. Although described with reference to error rate and read latency, the performance level assigned to a page may additionally or alternatively be based on (e.g., a function of) the quantity of access operations performed on the page. Thus, the performance level assigned to a page may be based on (e.g., a function of) the error rate for the page, the read latency for the page, the quantity of write operations performed on the page, the quantity of read operations performed on the page, or any combination thereof, among other examples.

In addition to assigning page performance ratings, the memory system 310 may assign priority levels to data sets. Alternatively, the memory system 310 may determine priority levels assigned to data sets by another device (e.g., the host system 305). The priority level assigned to a data set may be based on (e.g., a function of) the type of information included in the data set, the error-tolerance of the data set, the latency tolerance of the data set, or any combination thereof, among other examples. For ease of reference, the priority ratings are denoted with numerals, where 1 is the highest priority rating and 5 is the lowest priority rating.

The performance ratings, priority ratings, or both, may be stored in the memory system 310. For example, the performance rating for a page and the priority rating for the data in the page may be stored in an area of the page reserved for storing metadata. Alternatively, the memory system 310 may store the ratings in a local memory.

The memory system 310 may determine a mapping between priority ratings and performance ratings, which may be referred to as a priority-to-performance (P2P) mapping. For example, the memory system 310 may determining a P2P mapping as illustrated in Table 3, where priority rating 1 maps to performance rating A, priority rating 2 maps to performance rating B, priority rating 3 maps to performance rating C, priority rating 4 maps to performance rating D, and priority rating 5 maps to performance rating F.

TABLE 3

| Priority Rating | Performance Rating |
| --- | --- |
| 1 | A |
| 2 | B |
| 3 | C |
| 4 | D |
| 5 | E |

The memory system 310 may use the P2P mapping between priority ratings and performance ratings to select appropriate pages for writing data sets. For example, if a data set has priority 1, the memory system 310 may select a page with performance rating A for writing the data set. If a data set has priority 2, the memory system 310 may select a page with performance rating B for writing the data set. And so on and so forth.

In some examples, the memory system 310 may use the P2P mapping to select pages for writing an incoming data set (e.g., a data set that is received from the host system 305). In such examples, the memory system 310 may also receive an indication of the priority ratings assigned to the subsets of data in the received data set. Alternatively, the memory system 310 may determine the priority ratings independently (e.g., based on the type and tolerance(s) of the subsets).

In some examples, the memory system 310 may use the P2P mapping to select pages for writing a data set that is involved in a maintenance operation, such as a garbage collection operation or a refresh operation. FIG. 3 illustrates an example of a maintenance operation in which data assigned priority 1 is transferred from a page with performance rating B to a page with performance rating A; data assigned priority 2 is transferred from a page with performance rating D to a page with performance rating B; data assigned priority 3 is transferred from a page with performance rating A to a page with performance rating C; data assigned priority 4 is transferred from a page with performance rating F to a page with performance rating D; and data assigned priority 5 is transferred from a page with performance rating C to a page with performance rating F.

In addition to using the P2P mapping to select pages for writing subsets of a data set, the memory system 310 may also use the P2P mapping to select the block for writing the data set. For instance, if the average priority rating for a data set is a 2, the memory system 310 may select a block with an average performance rating of B for writing the data set. Within that block, the memory system 310 may select pages for writing subsets of the data based on (e.g., using) the P2P mapping.

In some examples, the memory system 310 may retire pages of a block that otherwise remains in use. For example, within a block the memory system 310 may retire F-rated pages by adding the pages to a list of pages to avoid for access operations. However, the memory system 310 may continue to use the other pages in the block (e.g., pages with performance ratings D and higher) for access operations.

Thus, the memory system 310 may preserve capacity (and efficiently use high-performing pages) by using a P2P mapping so that the memory system 310 can write data subsets to pages with appropriate performance metrics. Although described with reference to priority ratings and performance ratings, the techniques described herein may be applied to other types of ratings.

Figure 4:
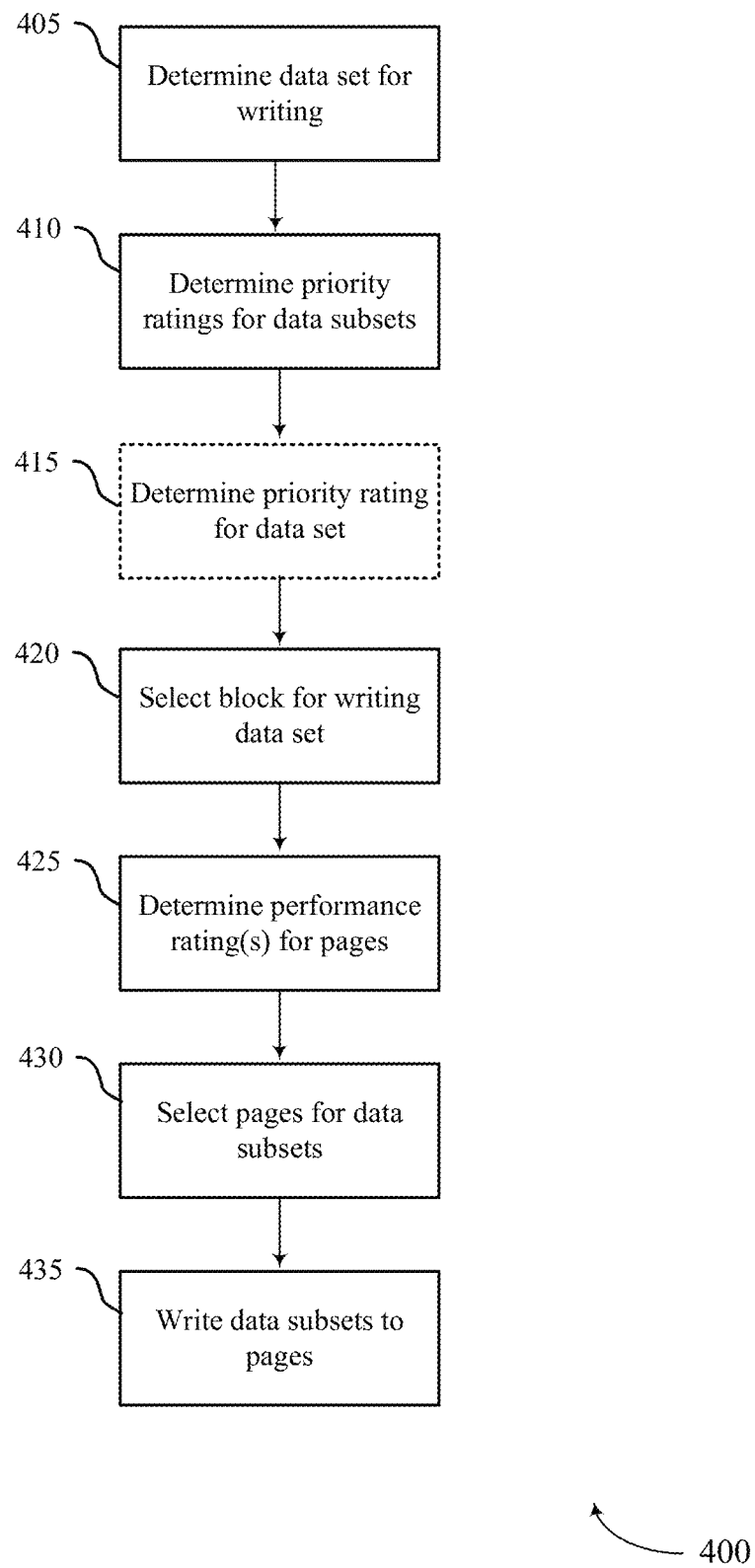
FIG. 4 illustrates an example of a process flow that supports rating-based mapping of data to memory in accordance with examples as disclosed herein.

FIG. 4 illustrates an example of a process flow 400 that supports rating-based mapping of data to memory in accordance with examples as disclosed herein. The process flow 400 may be implemented by system, such as a memory system, a memory device, or a memory die as described herein. Implementation of the process flow may allow the system to preserve memory capacity and efficiently use high performing pages, among other advantages.

Aspects of the process flow 400 may be implemented by a controller, among other components. Additionally or alternatively, aspects of the process flow 400 may be implemented as instructions stored in memory (e.g., firmware stored in a memory coupled with a memory system 110, a memory system 210, or a memory system 310). For example, the instructions, if executed by a controller (e.g., the memory system controller 115, a local controller 135, or a storage controller 230), may cause the controller to perform the operations of the process flow 400.

At 405, a data set may be determined (e.g., by the system) for writing. For example, the system may receive a data set for writing from a host system. Alternatively, the system may determine a data set for writing as part of a maintenance operation, such as a garbage collection operation or a refresh operation. At 410, the system may determine priority ratings for subsets of the data set, referred to as data subsets. If the data set includes N data subsets, as an example, the system may determine a first priority rating for the first data subset and may determine a second priority rating for the second data subset, and so on and so forth for the N data subsets. That is, the system may determine up to N priorities for N data subsets.

The system may determine the priority ratings based on (e.g., using) priority information associated with the data subsets, which may be stored in the system. The priority information stored in the system may be determined by the system based on indications of priority communicated by a host system (e.g., the host system may indicate an assigned priority rating for each data subset). Alternatively, the priority information may be determined by the system based on the type of information included in the data subset, the error-tolerance of the data subset, the latency tolerance of the data subset, or any combination thereof, among other examples. For example, the system may assign a high priority rating (e.g., priority 1) to data sets that: include operating system (OS) information, are error intolerant, are latency intolerant, or any combination thereof. Different types of information may be assigned different priority ratings. For example, data used to boot-up an operating system may be assigned a higher priority because system's may request that such data have a low read latency and a high reliability. In another example, write booster data (e.g., data written to SLC blocks in a write booster mode) may receive a different priority than data written to TLC blocks. In another example, data related to media may receive a different priority due to the large nature of the data and sequential nature of the data.

At 415, a priority rating for the overall data set may be determined (e.g., by the system). For instance, the system may determine that the data set has an average priority rating that is based on (e.g., a function of) the priority ratings for the data subsets in the data set.

At 420, a block for writing the data set may be selected (e.g., by the system). In some examples (e.g., in a refresh operation that re-writes data to the same block), the block selected at 420 may the block that stores the set of data for the refresh operation. In other examples (e.g., in garbage collection operations, in refresh operations that transfer data between blocks), the block selected at 420 may be a block other than the block that stores the set of data. In such examples, the system may select the block based on (e.g., using) the performance rating for the block. For instance, the system may select the block based on (e.g., using) the block having a performance rating that corresponds to the performance rating for the data set. In some examples, the performance rating for the block may be the average performance rating based on the performance ratings for the pages in the block. However, other methods of determining the performance rating for a block based on page performance ratings are contemplated and within the scope of the present disclosure.

At 425, performance ratings for the pages of the block may be determined (e.g., by the system). For example, the system may determine a first performance rating for a first page of the block and may determine a second performance rating for a second page of the block. In some examples, determining the performance ratings may involve reading performance information that indicates the performance ratings from the pages. For example, the memory system may read performance information from the first block that indicates the first performance rating for the first block. Similarly, the memory system may read performance information from the second block that indicates the second performance rating for the second block. The performance rating for a page may be based on (e.g., a function of) the error rate for the page, the read latency for the page, or a combination thereof, among other performance metrics of the page.

At 430, pages of the block for writing the data subsets may be selected (e.g., by the system). The system may select the pages based on (e.g. using) the performance ratings for the pages and based on (e.g., using) the priority ratings for the data subsets. In some examples, the system may select the pages based on (e.g., using) a P2P mapping table as described herein. For example, the system may select the first page (from the candidate pages in the block) as the target page for writing the first data subset based on (e.g., due to) the performance rating of the first page mapping to the priority rating of the first data subset. Similarly, the system may select the second page (from the candidate pages in the block) as the target page for writing the second data subset based on (e.g., due to) the performance rating of the second page mapping to the priority rating of the first data subset.

If the selected block runs out of pages with performance ratings that map to the priority rating of a data subset, the system may write the data subset to a page with a performance rating that is higher than the performance rating that maps to the priority rating of the data subset. For example, if a data subset has priority rating 3 and the block is out of pages with performance rating C, the memory system may write the data subset to a page with performance rating B. Alternatively, the system may write the data subset to a page with a performance rating that is lower than the performance rating that maps to the priority rating of the data subset. For example, if a data subset has priority rating 3 and the block is out of pages with performance rating C, the memory system may write the data subset to a page with performance rating D.

The determination to select a page with a higher or lower performance rating may be based on (e.g., a function of) the type of the data subset, the tolerances of the data subset, the performance metrics for the page, or any combination thereof. For instance, if the block is out of pages with performance rating C and a data subset with priority rating 3 has a low tolerance for error and a high tolerance for latency, the system may select between a page with performance rating B and a page with performance rating D based on the respective error rate and read latencies of the pages (e.g., the system may select the page with the lower error rate and the higher read latency).

At 435, after selection of the pages the data subsets may be written (e.g., by the system) to the pages of the block. For example, the system may write the first data subset to the first page and may write the second data subset to the second page. In some examples, the system may also write the priority information for a data subset in the same page as the data subset. The system may also update the performance information for the page if the performance information has changed (e.g., due to writing the data subset to the page).

Thus, the system may preserve memory capacity, and efficiently use high performing pages, by mapping data subsets to pages with appropriate performance metrics given the priority ratings of the data subsets. Alternative examples of the foregoing may be implemented, where some operations are performed in a different order than described, are performed in parallel, or are not performed at all. In some cases, operations may include additional features not mentioned herein, or further operations may be added. Additionally, some operations may be performed multiple times or some combinations of operations may repeat or cycle.

Figure 5:
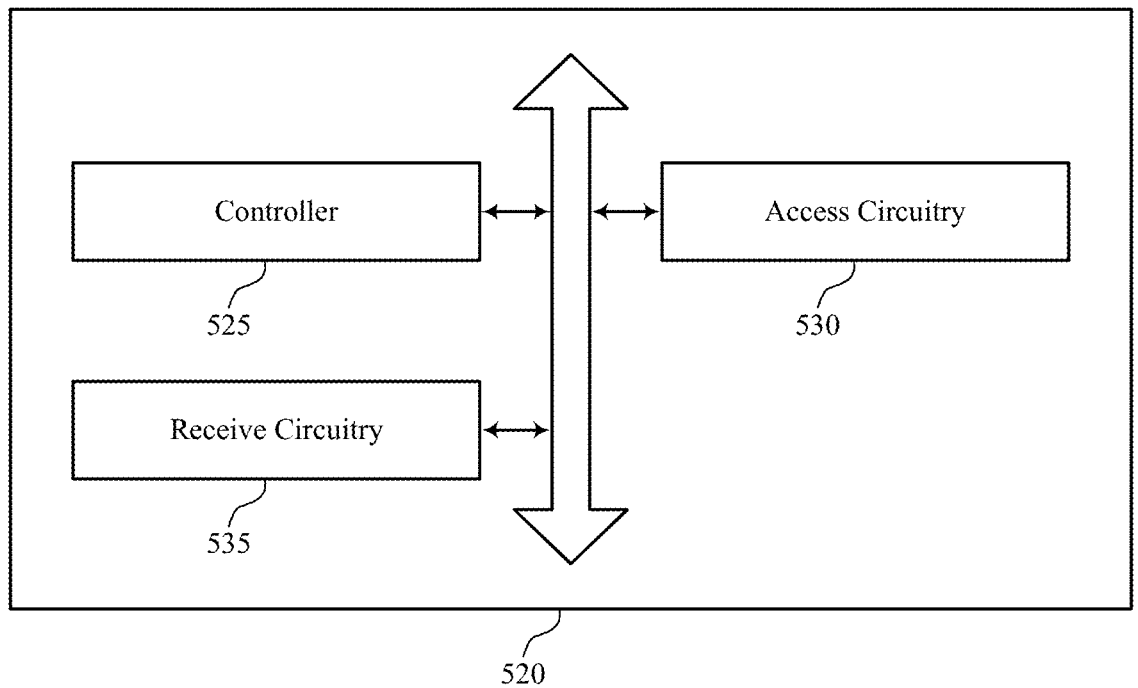
FIG. 5 shows a block diagram of a memory system that supports rating-based mapping of data to memory in accordance with examples as disclosed herein.

FIG. 5 shows a block diagram 500 of a memory system 520 that supports rating-based mapping of data to memory in accordance with examples as disclosed herein. The memory system 520 may be an example of aspects of a memory system as described with reference to FIGS. 1 through 4. The memory system 520, or various components thereof, may be an example of means for performing various aspects of rating-based mapping of data to memory as described herein. For example, the memory system 520 may include a controller 525, an access circuitry 530, a receive circuitry 535, or any combination thereof. Each of these components may communicate, directly or indirectly, with one another (e.g., via one or more buses).

The controller 525 may be configured as or otherwise support a means for determining a first rating for a set of data selected for writing to a memory system. In some examples, the controller 525 may be configured as or otherwise support a means for selecting a target page of a block in the memory system for writing the set of data based at least in part on a second rating for the target page. The access circuitry 530 may be configured as or otherwise support a means for writing the set of data to the target page based at least in part on the first rating for the set of data corresponding to the second rating for the target page.

In some examples, the controller 525 may be configured as or otherwise support a means for determining a third rating for a second page of a plurality of candidate pages for writing the set of data, where the target page is selected from the plurality of candidate pages based at least in part on the third rating for the second page and the second rating for the target page.

In some examples, the receive circuitry 535 may be configured as or otherwise support a means for receiving the set of data from a host system, where the first rating for the set of data is determined based at least in part on receiving the set of data.

In some examples, the receive circuitry 535 may be configured as or otherwise support a means for receiving, from the host system, rating information that indicates the first rating for the set of data, where the first rating is determined based at least in part on the rating information.

In some examples, the controller 525 may be configured as or otherwise support a means for determining, before determining the first rating for the set of data, whether to perform a maintenance operation on a second block of the memory system that stores the set of data, where the first rating for the set of data is determined based at least in part on determining to perform the maintenance operation.

In some examples, the access circuitry 530 may be configured as or otherwise support a means for reading, from the second block, rating information that indicates the first rating for the set of data, where the first rating is determined based at least in part on reading the rating information.

In some examples, the controller 525 may be configured as or otherwise support a means for determining a third rating for the block based at least in part on the second rating for the target page. In some examples, the controller 525 may be configured as or otherwise support a means for selecting the block for writing the set of data based at least in part on the third rating for the block.

In some examples, the controller 525 may be configured as or otherwise support a means for determining a fourth rating for a second page of the block, where the third rating for the block is based at least in part on the fourth rating for the second page.

In some examples, the controller 525 may be configured as or otherwise support a means for determining a type of the set of data, where the first rating is determined based at least in part on the type of the set of data.

In some examples, the controller 525 may be configured as or otherwise support a means for determining a latency tolerance for the set of data, where the first rating is determined based at least in part on the latency tolerance for the set of data.

In some examples, the controller 525 may be configured as or otherwise support a means for determining an error tolerance of the set of data, where the first rating is determined based at least in part on the error tolerance for the set of data.

In some examples, the controller 525 may be configured as or otherwise support a means for determining an error rate for the target page, where the second rating is determined based at least in part on the error rate for the target page.

In some examples, the controller 525 may be configured as or otherwise support a means for determining a quantity of access operations performed on the target page, where the second rating is determined based at least in part on the quantity of access operations.

In some examples, the first rating includes a priority rating that indicates a priority of the set of data. In some examples, the second rating includes a performance rating that indicates a performance of the target page.

Figure 6:
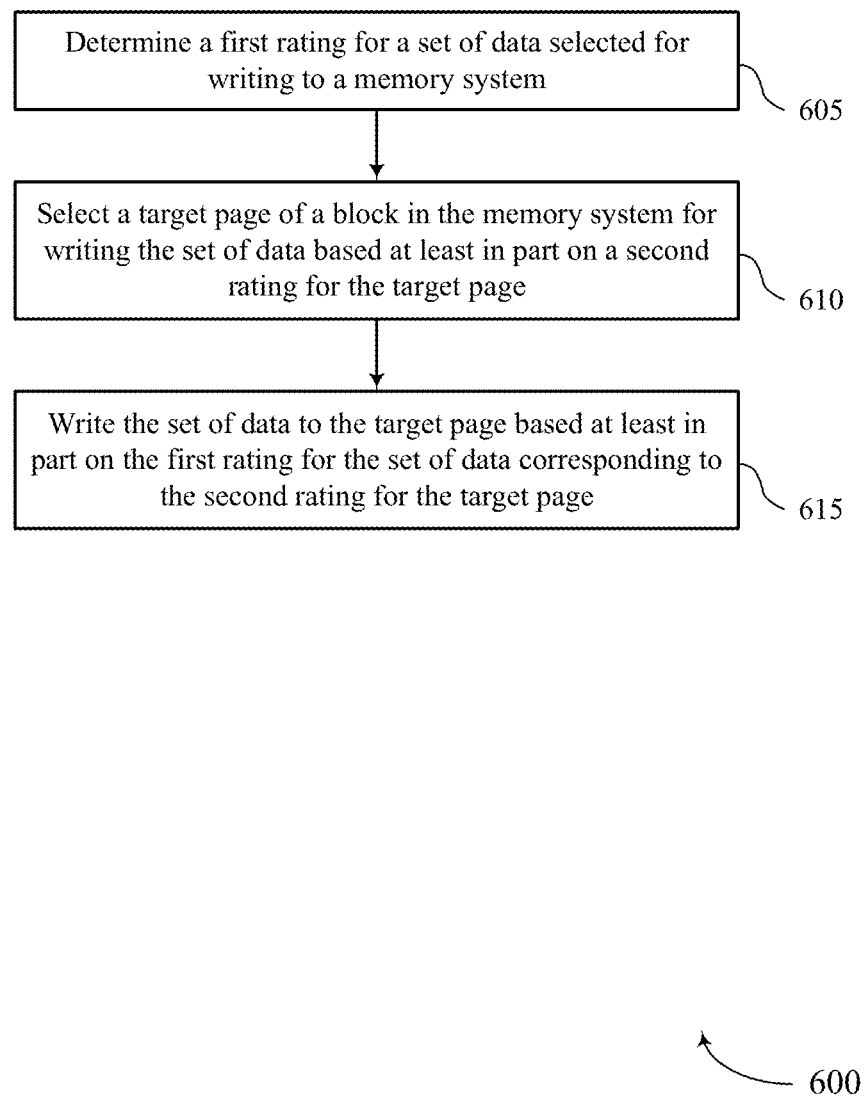
FIG. 6 shows a flowchart illustrating a method or methods that support rating-based mapping of data to memory in accordance with examples as disclosed herein.

FIG. 6 shows a flowchart illustrating a method 600 that supports rating-based mapping of data to memory in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include determining a first rating for a set of data selected for writing to a memory system. The operations of 605 may be performed in accordance with examples as disclosed herein. In some examples, aspects of the operations of 605 may be performed by a controller 525 as described with reference to FIG. 5.

At 610, the method may include selecting a target page of a block in the memory system for writing the set of data based at least in part on a second rating for the target page. The operations of 610 may be performed in accordance with examples as disclosed herein. In some examples, aspects of the operations of 610 may be performed by a controller 525 as described with reference to FIG. 5.

At 615, the method may include writing the set of data to the target page based at least in part on the first rating for the set of data corresponding to the second rating for the target page. The operations of 615 may be performed in accordance with examples as disclosed herein. In some examples, aspects of the operations of 615 may be performed by an access circuitry 530 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining a first rating for a set of data selected for writing to a memory system; selecting a target page of a block in the memory system for writing the set of data based at least in part on a second rating for the target page; and writing the set of data to the target page based at least in part on the first rating for the set of data corresponding to the second rating for the target page.

Aspect 2: The method, apparatus, or non-transitory computer-readable medium of aspect 1, further including operations, features, circuitry, logic, means, or instructions, or any combination thereof for determining a third rating for a second page of a plurality of candidate pages for writing the set of data, where the target page is selected from the plurality of candidate pages based at least in part on the third rating for the second page and the second rating for the target page.

Aspect 3: The method, apparatus, or non-transitory computer-readable medium of any of aspects 1 through 2, further including operations, features, circuitry, logic, means, or instructions, or any combination thereof for receiving the set of data from a host system, where the first rating for the set of data is determined based at least in part on receiving the set of data.

Aspect 4: The method, apparatus, or non-transitory computer-readable medium of aspect 3, further including operations, features, circuitry, logic, means, or instructions, or any combination thereof for receiving, from the host system, rating information that indicates the first rating for the set of data, where the first rating is determined based at least in part on the rating information.

Aspect 5: The method, apparatus, or non-transitory computer-readable medium of any of aspects 1 through 4, further including operations, features, circuitry, logic, means, or instructions, or any combination thereof for determining, before determining the first rating for the set of data, whether to perform a maintenance operation on a second block of the memory system that stores the set of data, where the first rating for the set of data is determined based at least in part on determining to perform the maintenance operation.

Aspect 6: The method, apparatus, or non-transitory computer-readable medium of aspect 5, further including operations, features, circuitry, logic, means, or instructions, or any combination thereof for reading, from the second block, rating information that indicates the first rating for the set of data, where the first rating is determined based at least in part on reading the rating information.

Aspect 7: The method, apparatus, or non-transitory computer-readable medium of any of aspects 1 through 6, further including operations, features, circuitry, logic, means, or instructions, or any combination thereof for determining a third rating for the block based at least in part on the second rating for the target page and selecting the block for writing the set of data based at least in part on the third rating for the block.

Aspect 8: The method, apparatus, or non-transitory computer-readable medium of aspect 7, further including operations, features, circuitry, logic, means, or instructions, or any combination thereof for determining a fourth rating for a second page of the block, where the third rating for the block is based at least in part on the fourth rating for the second page.

Aspect 9: The method, apparatus, or non-transitory computer-readable medium of any of aspects 1 through 8, further including operations, features, circuitry, logic, means, or instructions, or any combination thereof for determining a type of the set of data, where the first rating is determined based at least in part on the type of the set of data.

Aspect 10: The method, apparatus, or non-transitory computer-readable medium of any of aspects 1 through 9, further including operations, features, circuitry, logic, means, or instructions, or any combination thereof for determining a latency tolerance for the set of data, where the first rating is determined based at least in part on the latency tolerance for the set of data.

Aspect 11: The method, apparatus, or non-transitory computer-readable medium of any of aspects 1 through 10, further including operations, features, circuitry, logic, means, or instructions, or any combination thereof for determining an error tolerance of the set of data, where the first rating is determined based at least in part on the error tolerance for the set of data.

Aspect 12: The method, apparatus, or non-transitory computer-readable medium of any of aspects 1 through 11, further including operations, features, circuitry, logic, means, or instructions, or any combination thereof for determining an error rate for the target page, where the second rating is determined based at least in part on the error rate for the target page.

Aspect 13: The method, apparatus, or non-transitory computer-readable medium of any of aspects 1 through 12, further including operations, features, circuitry, logic, means, or instructions, or any combination thereof for determining a quantity of access operations performed on the target page, where the second rating is determined based at least in part on the quantity of access operations.

Aspect 14: The method, apparatus, or non-transitory computer-readable medium of any of aspects 1 through 13, where the first rating includes a priority rating that indicates a priority of the set of data and the second rating includes a performance rating that indicates a performance of the target page.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices comprising a plurality of blocks; and
processing circuitry coupled with the one or more memory devices and configured to cause the memory system to:
determine a first priority rating for data selected for writing to the memory system;
write a first portion of the data to one or more first pages of a block of the plurality of blocks, wherein a first performance rating for the one or more first pages corresponds to the first priority rating; and
write a second portion of the data to one or more second pages of the block of the plurality of blocks, wherein a second performance rating for the one or more second pages corresponds to a second priority rating different than the first priority rating.

2. The memory system of claim 1, wherein the processing circuitry is further configured to cause the memory system to:
determine that a size of the data exceeds a storage capacity of the one or more first pages, wherein the processing circuitry is configured to cause the memory system to write the second portion of the data to the one or more second pages in response to determining that the size of the data exceeds the storage capacity of the one or more first pages.

3. The memory system of claim 1, wherein the processing circuitry is further configured to cause the memory system to:
determine the first performance rating of the one or more first pages in accordance with one or more performance metrics that comprise a read latency associated with the one or more first pages, an error rate associated with the one or more first pages, a quantity of write operations performed on the one or more first pages, a quantity of read operations performed on the one or more first pages, or any combination thereof.

4. The memory system of claim 3, wherein the processing circuitry is configured to cause the memory system to determine the first performance rating in response to the one or more performance metrics satisfying a threshold.

5. The memory system of claim 3, wherein the processing circuitry is further configured to cause the memory system to:
compare the one or more performance metrics of the one or more first pages to one or more performance metrics of the one or more second pages, wherein the processing circuitry is configured to cause the memory system to determine the first performance rating of the one or more first pages in accordance with the comparison.

6. The memory system of claim 1, wherein the processing circuitry is further configured to cause the memory system to:
select the one or more second pages for writing the second portion of the data in accordance with an error tolerance, a latency tolerance of the data, or both.

7. The memory system of claim 1, wherein the second performance rating is higher than the first performance rating.

8. The memory system of claim 1, wherein the second performance rating is lower than the first performance rating.

9. The memory system of claim 1, wherein:
the first priority rating indicates a priority of the data;
the first performance rating indicates a performance of the one or more first pages; and
the second performance rating indicates a performance of the one or more second pages.

10. A memory system, comprising:
one or more memory devices comprising a plurality of blocks; and
processing circuitry coupled with the one or more memory devices and configured to cause the memory system to:
determine a first priority rating for data selected for writing to the memory system and a first performance rating for a block of the plurality of blocks in accordance with a second performance rating of a first page of the block; and
write the data to the block in response to determining that the first performance rating for the block corresponds to the first priority rating for the data.

11. The memory system of claim 10, wherein the processing circuitry is further configured to cause the memory system to:
determine a third performance rating of a second page of the block, wherein the processing circuitry is configured to cause the memory system to determine the first performance rating in response to determining the third performance rating of the second page of the block.

12. The memory system of claim 10, wherein the processing circuitry is further configured to cause the memory system to:
select the first page for writing the data in accordance with the second performance rating; and
write the data to the first page in response to determining that the first priority rating for the data corresponds to the second performance rating for the first page.

13. The memory system of claim 10, wherein the processing circuitry is configured to cause the memory system to:
determine the first performance rating of the first page in accordance with on one or more performance metrics that comprises a read latency associated with the first page, an error rate associated with the first page, a quantity of write operations performed on the first page, a quantity of read operations performed on the first page, or any combination thereof.

14. The memory system of claim 10, wherein the processing circuitry is configured to determine the first priority rating in accordance with a type of the data, a latency tolerance of the data, an error tolerance of the data, or any combination thereof.

15. The memory system of claim 10, wherein the first performance rating is determined in accordance with an average of relative performance ratings of pages of the block.

16. The memory system of claim 10, wherein:
the first priority rating indicates a priority of the data;
the first performance rating indicates a performance of the block; and
the second performance rating indicates a performance of the first page.

17. A non-transitory computer-readable medium storing code comprising instructions which, when executed by processing circuitry of a memory system, cause the memory system to:
- determine a first priority rating for data selected for writing to the memory system;
- write a first portion of the data to one or more first pages of a block of a plurality of blocks, wherein a first performance rating for the one or more first pages corresponds to the first priority rating; and
- write a second portion of the data to one or more second pages of the block of the plurality of blocks, wherein a second performance rating for the one or more second pages corresponds to a second priority rating different than the first priority rating.

18. The non-transitory computer-readable medium of claim 17, wherein the instructions, when executed by the processing circuitry of the memory system, further cause the memory system to:
- determine that a size of the data exceeds a storage capacity of the one or more first pages, wherein the processing circuitry is configured to cause the memory system to write the second portion of the data to the one or more second pages in response to determining that the size of the data exceeds the storage capacity of the one or more first pages.

19. The non-transitory computer-readable medium of claim 17, wherein the instructions, when executed by the processing circuitry of the memory system, further cause the memory system to:
- determine the first performance rating of the one or more first pages in accordance with on one or more performance metrics that include a read latency associated with the one or more first pages, an error rate associated with the one or more first pages, a quantity of write operations performed on the one or more first pages, a quantity of read operations performed on the one or more first pages, or any combination thereof.

20. The non-transitory computer-readable medium of claim 17, wherein the instructions, when executed by the processing circuitry of the memory system, further cause the memory system to:
- select the one or more second pages for writing the second portion of the data in accordance with an error tolerance, a latency tolerance of the data, or both.

* * * * *